United States Patent [19]
Inaba

[11] Patent Number: 5,880,951
[45] Date of Patent: Mar. 9, 1999

[54] CAPACITOR-TYPE POWER SUPPLY UNIT

[75] Inventor: Atsushi Inaba, Wako, Japan

[73] Assignee: Honda Giken Kogyo Kabushiki Kaisha, Tokyo, Japan

[21] Appl. No.: 941,503

[22] Filed: Sep. 30, 1997

[30] Foreign Application Priority Data

Oct. 1, 1996 [JP] Japan ..................................... 8-278620

[51] Int. Cl.$^6$ ................................................. H02M 1/00
[52] U.S. Cl. ............................................ 363/144; 363/141
[58] Field of Search ..................................... 363/141, 144, 363/146; 257/72; 318/139; 361/328

[56] References Cited

U.S. PATENT DOCUMENTS

| | | |
|---|---|---|
| 3,978,377 | 8/1976 | Constanti ................................. 361/520 |
| 4,292,665 | 9/1981 | Hersom et al. .......................... 363/141 |
| 5,130,918 | 7/1992 | Schuster .................................. 363/144 |
| 5,132,896 | 7/1992 | Nishizawa et al. ...................... 363/144 |
| 5,623,399 | 4/1997 | Ishii et al. ............................... 363/141 |
| 5,713,426 | 2/1998 | Okamura .................................. 318/189 |

*Primary Examiner*—Stuart N. Hecker
*Attorney, Agent, or Firm*—Lyon & Lyon LLP

[57] ABSTRACT

A capacitor-type power supply unit includes a capacitor block. The capacitor block has a plurality of capacitor cells and bus bars connecting the capacitor cells in series. A plurality of electronic circuit boards are connected respectively to the capacitor cells, for controlling corresponding ones of the capacitor cells. The electronic circuit boards and the bus bars are mounted on the capacitor cells.

19 Claims, 10 Drawing Sheets

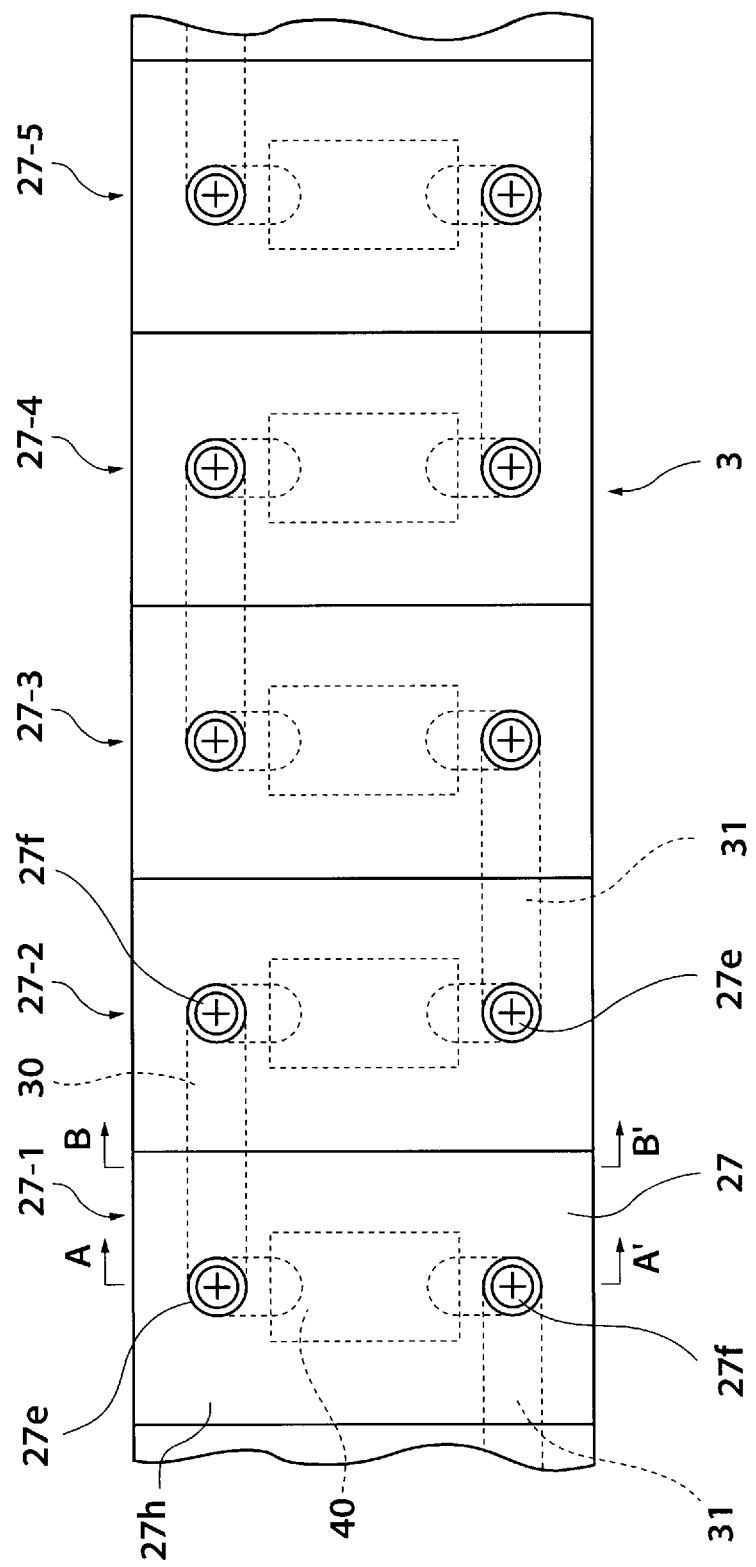

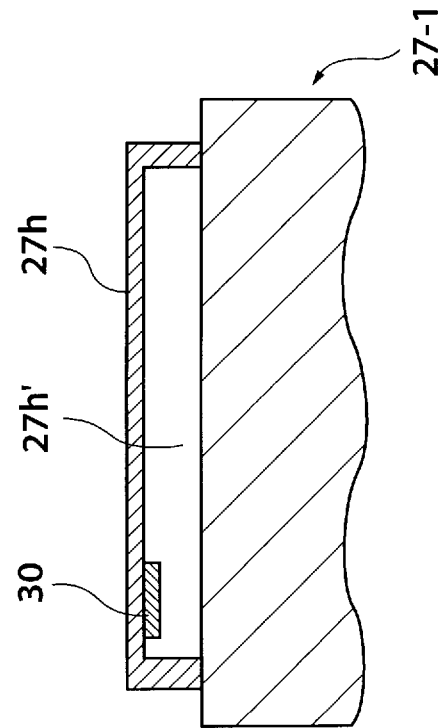
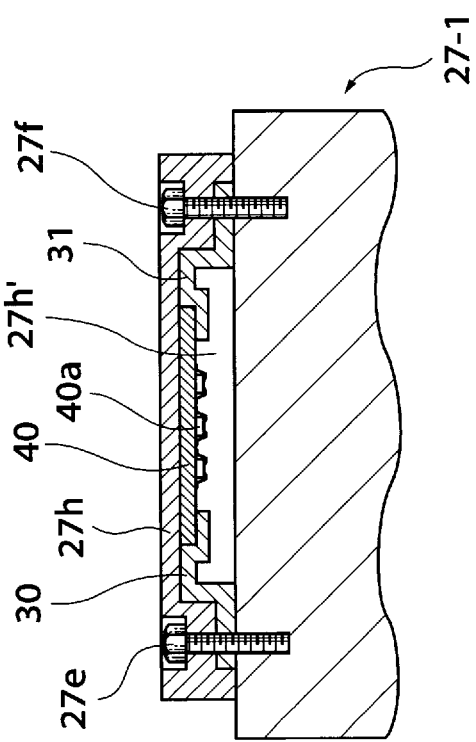

CAPACITOR-TYPE POWER SUPPLY UNIT

BACKGROUND OF THE INVENTION

1. Field of the Invention

This invention relates to a capacitor-type power supply unit, and more particularly to a capacitor-type power supply unit for electric vehicles.

2. Prior Art

Conventionally, a capacitor-type power supply unit of this kind includes at least two capacitor blocks each having a plurality of capacitor cells connected in series via a bus bar, and a plurality of electronic circuits connected to the capacitor cells, for controlling the operation of each capacitor cell.

Further, the capacitor cells of the capacitor blocks, which are connected in series, may employ approximately one hundred of electric double-layer capacitors, each of which has an output voltage of 3.5 volts. Therefore, one capacitor block provides an output voltage of approximately 350 volts when it is fully charged. This kind of capacitor-type power supply unit is used in such a manner that the connection of the two capacitor blocks is changed over between parallel connection and series connection depending on the amount of a remaining electric charge stored therein, operating conditions of an engine installed on the automotive vehicle, and traveling conditions of the vehicle.

In the conventional capacitor-type power supply unit, the electric circuits are not provided integrally with the capacitor cells, but are mounted at a location remote therefrom, e.g. at a part of a pulse width modulation (PWM) driver as a motor driver (PDU) or in the vicinity of a motor.

Since in the conventional capacitor-type power supply unit for electric vehicles, the electronic circuits are not provided integrally with the capacitor cells, but are mounted at a location remote therefrom, the wiring between the terminals of the capacitor cells and the electronic circuits tends to become long with large impedance, which causes a large voltage drop in the capacitor cells of the capacitor-type power supply unit.

SUMMARY OF THE INVENTION

It is an object of the invention to provide a capacitor-type power supply unit which is capable of reducing a voltage drop in capacitor cells thereof by decreasing the impedance of wiring between the terminals of the capacitor cells and electronic circuits connected thereto.

To attain the above object, the invention provides a capacitor-type power supply unit including at least one capacitor block having a plurality of capacitor cells, and bus bars connecting the capacitor cells in series, and a plurality of electronic circuit boards connected respectively to the capacitor cells, for controlling corresponding ones of the capacitor cells.

The capacitor-type power supply unit is characterized in that the electronic circuit boards and the bus bars are mounted on the capacitor cells.

Preferably, the capacitor-type power supply unit includes a base board mounted on a top of each of the capacitor cells, the one of the electronic circuit boards and one of the bus bars corresponding to the one of the electronic circuit boards being mounted on the base board.

More preferably, the capacitor-type power supply unit includes radiating fins provided on the base board.

More preferably, the base board is formed of an insulating material.

More preferably, each of the capacitor cells has a positive electrode and a negative electrode, the one of the bus bars corresponding to the one of the electronic circuit boards connecting the positive electrode of the each of the capacitor cells to the negative electrode of another one of the capacitor cells adjacent to the each of the capacitor cells.

Further preferably, the positive electrode and the negative electrode of the each of the capacitor cells are formed by electrode bolts, each of the electrode bolts fixing the base board and the one of the bus bars corresponding to the one of the electronic circuit boards to the each of the capacitor cells.

Further preferably, the capacitor cells are arranged in a manner such that one of the positive electrode and the negative electrode of the each of the capacitor cells and one of the positive electrode and the negative electrode of the another one of the capacitor cells adjacent to the each of the capacitor cells, which is opposite in polarity to the one of the positive electrode and the negative electrode of the each of the capacitor cells, are located on the same side of the capacitor cells.

Alternatively, the capacitor cells are arranged in a manner such that one of the positive electrode and the negative electrode of the each of the capacitor cells and one of the positive electrode and the negative electrode of the another one of the capacitor cells adjacent to the each of the capacitor cells, which is the same in polarity to the one of the positive electrode and the negative electrode of the each of the capacitor cells, are located on the same side of the capacitor cells.

More preferably, the base board and the top of each of the capacitor cells define a space therebetween, the one of the electronic circuit boards and the one of the bus bars corresponding to the one of the electronic circuit boards being accommodated within the space.

Further preferably, the one of the electronic circuit boards is fixedly sandwiched between the one of the bus bars corresponding to the one of the electronic circuit boards and an underside of the base board.

In one still more preferred form, each of the electronic circuit boards has at least one electronic part mounted thereon, each of the electronic circuit boards being disposed in a manner such that the at least one electronic part faces toward the top of one of the capacitor cells corresponding to each of the electronic circuit boards.

In another still more preferred form, the base board has a through hole formed therein and corresponding in size to a size of the one of the electronic circuit boards, the one of the electronic circuit boards being mounted in the through hole and having at least one electronic part mounted on a side thereof remote from the each of the capacitor cells, the capacitor-type power supply unit including a cover for covering the through hole.

Even more preferably, the one of the electronic circuit boards has radiating fins mounted on a side thereof facing toward each of the capacitor cells.

In another still more preferred form, the base board has a through hole formed therein and corresponding in size to a size of the one of the electronic circuit boards, the one of the electronic circuit boards being mounted in the through hole and having at least two electronic parts mounted both on a side thereof remote from the each of the capacitor cells and a side thereof facing toward each of the capacitor cells, the capacitor-type power supply unit including a cover for covering the through hole.

In another still more preferred form, the base board has a through hole formed therein and corresponding in size to a size of the one of the electronic circuit boards, the one of the electronic circuit boards being arranged on the one of the bus bars corresponding to the one of the electronic circuit boards, the capacitor-type power supply unit including a cover for covering the through hole, the cover having radiating fins mounted thereon.

Still more preferably, the electrode bolts have heads, the base board having through holes formed therein, for receiving the heads of the electrode bolts, respectively, the capacitor-type power supply unit including a cover for covering the top of the base board including the holes, the cover having radiating fins mounted thereon.

Further preferably, the one of the bus bars corresponding to the one of the electronic circuit boards is fixed to the underside of the base board via an insulating material interposed therebetween.

Preferably, the capacitor-type power supply unit is installed on an electric vehicle.

The above and other objects, features, and advantages of the invention will become more apparent from the following detailed description taken in conjunction with the accompanying drawings.

BRIEF DESCRIPTION OF THE DRAWINGS

FIG. 2 is a partial plan view showing essential parts of a capacitor block 3 appearing in FIG. 1;

FIG. 3A is a cross-sectional view of the capacitor block taken on line A—A in FIG. 2;

FIG. 3B is a cross-sectional view of the capacitor block taken on line B—B in FIG. 2;

DETAILED DESCRIPTION

The invention will now be described in detail with reference to the drawings showing embodiments thereof.

Figure 1:
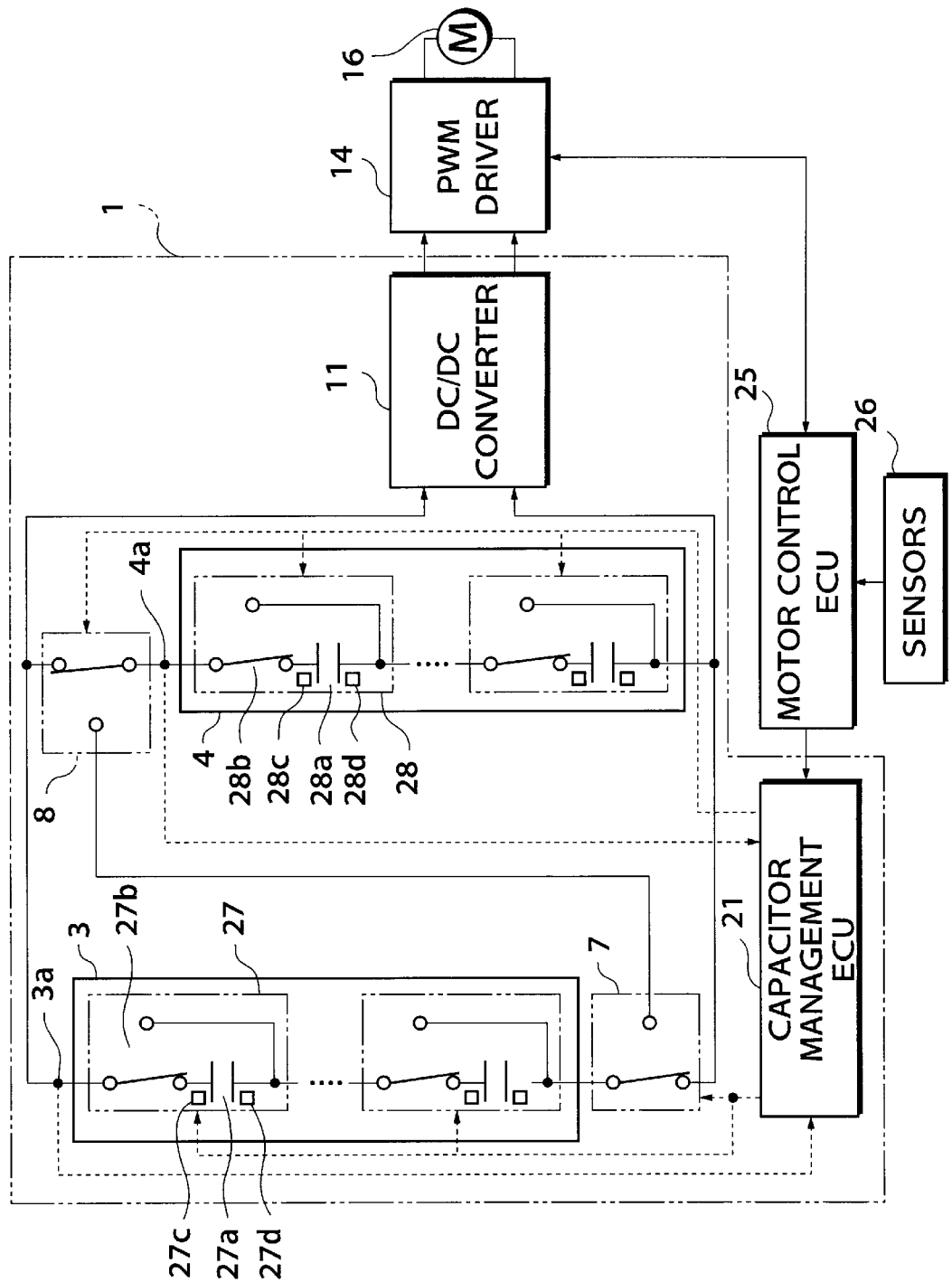
FIG. 1 is a block diagram showing the arrangement of a capacitor-type power supply unit according to a first embodiment of the invention.

FIG. 1 shows the arrangement of a capacitor-type power supply unit installed on an electric vehicle, according to a first embodiment of the invention.

The electric vehicle has installed thereon a capacitor-type power supply unit 1, a pulse width modulation driver (hereinafter referred to as "the PWM driver) 14, an electric motor 16, and a motor control ECU 25. The PWM driver 14 supplies the electric motor 16 with electric power in response to a control signal from the motor control ECU 25. The electric motor 16 transmits power to wheels, not shown, of the electric vehicle.

The capacitor-type power supply unit 1 is comprised of a pair of capacitor blocks 3, 4, selector switches 7, 8, a DC—DC converter 11, and a capacitor management ECU 21, and supplies the PWM driver 14 with a constant voltage. A circuit for charging the capacitor blocks 3, 4 is not shown or omitted from FIG. 1.

The capacitor blocks 3, 4 each have one hundred of 3.5-volt electric double-layer capacitor cells 27, 28 connected in series to generate output voltage of 350 volts when fully charged.

Each capacitor cell 27, 28 has a capacitor 27a, 28a and a bypass switch 27b, 28b. Arranged in the vicinity of the capacitors 27a, 28a are voltage sensors 27c, 28c for detecting voltages across the respective capacitors 27a, 28a, and temperature sensors 27d, 28d for detecting temperatures of the same.

If the voltage across the capacitor 27a or 28a detected by the voltage sensor 27c or 28c is lower than a predetermined value, and hence the capacitor 27a or 28a is determined to be deteriorated or short of electric charge, or if it is determined that the temperature of the capacitor 27a or 28a detected by the temperature sensor 27d or 28d is higher than a predetermined value, e.g. 60° C., the capacitor management ECU 21 operates the bypass switch 27b or 28b associated with the capacitor to thereby directly connect terminals of the capacitor cell 27 or 28, i.e. bypass the electric double-layer capacitor 27a or 28b.

The capacitor management ECU 21 is comprised of a CPU, a ROM, a RAM, a timer, an I/O interface, and a communication interface, all of which are well known.

The motor control ECU 25 is comprised of a CPU, a ROM, a RAM, a timer, an I/O interface, and a communication interface, all of which are well known, as well as various sensors 26 for detecting the amount of a remaining charge stored in the power supply unit, operating conditions of the motor and traveling conditions of the electric vehicle. The motor control ECU 25 delivers a command to the capacitor management ECU 21 in response to the detected operating conditions of the motor and the detected traveling conditions of the electric vehicle via the communication interface. The sensors 26 include a motor rotational speed sensor, a vehicle speed sensor, an accelerator position sensor, etc.

FIG. 2 shows essential parts of the capacitor block 3 of the power supply unit of FIG. 1. FIG. 3A shows a cross section of the capacitor block 3 taken on line A—A' in FIG. 2, while FIG. 3B a cross section of the same taken on line B—B' in FIG. 2. The capacitor block 4 is identical in construction with the capacitor block 3.

Referring to FIG. 2, a plurality of capacitor cells 27-1 to 27-5 are juxtaposed in a horizontal direction. The capacitor cells 27-1 to 27-5 are identical in construction with each other, and hence the capacitor cell 27-1 will be described on their behalf.

A positive terminal 27e and a negative terminal 27f are arranged on the top of the capacitor cells 27-1 at a predetermined space interval. A negative terminal 27f of a capacitor cell 27-2 is opposed to the positive terminal 27e of the capacitor cell 27-1, while a positive terminal 27e of the capacitor cell 27-2 is opposed to the negative terminal 27f of the capacitor cell 27-1.

On the top of the capacitor cell 27-1, the positive terminal 27e of the capacitor cell 27-1 and the negative terminal 27f of the capacitor cell 27-2 are connected to each other by a bus bar 30 which is generally U-shaped and stepped at opposite ends thereof, and the negative terminal 27f of the capacitor cell 27-1 and a positive terminal of a capacitor cell adjacent thereto on a left side as viewed in FIG. 2 are connected to each other by a bus bar 31 which is generally U-shaped and stepped at opposite ends thereof. The bus bars 30, 31 each have a thickness of 1 to 5 mm. The positive terminal 27e and the negative terminal 27f of the capacitor cell 27-1 are each formed by an electrode bolt, and also act as means for fixing the bus bars 30, 31 and a base board 27h, referred to hereinafter, to the capacitor cell 27-1 (see FIG. 3A).

The base board 27h having an outer shape adapted to the shape of the capacitor cell 27-1 in plan view is arranged on the top of the capacitor cell 27-1. The base board 27h is formed with through holes for receiving heads of the positive terminal 27e and the negative terminal 27f at respective locations, and has a recess 27' formed in the underside thereof for receiving an electronic circuit board 40, described hereafter, and bus bars 30 and 31 therein.

Further, as shown in FIG. 3A, the electronic circuit board 40, which has electronic devices 40a, such as switches 27b and 28b, mounted thereon, is attached to the bottom of the recess 27', i.e., the underside of the base board 27h. The electronic circuit board 40 has one end thereof joined to an end of the bus bar 30, and the other end thereof to an end of the bus bar 31 by spot welding or the like. Further, as shown in FIG. 3B, an intermediate portion of the bus bar 30 is in contact with the underside of the base board 27h. Also, an intermediate portion of bar 31 is similarly in contact with the underside of the base board 27h.

The positive terminal 27e and the negative terminal 27f formed by the electrode bolts fix the bus bars 30, 31 and the base board 27h to the capacitor cell 27-1.

According to the power supply unit of the present embodiment constructed as above, the electronic circuit board 40 and the bus bars 30, 31 are received in the recess 27h', whereby mechanical damage to the electronic circuit board 40 and the bus bars 30, 31 can be prevented. Alternatively, the electronic circuit board 40 and the bus bars 30, 31 may be mounted on the top of the base board 27h instead of being received within the recess 27h'. This makes it possible to mount and remove the electronic circuit board 40 with ease.

Further, the base board 27 may have an insulating function. This helps to prevent failure or an accident resulting from a short circuit. The base board 27h may be formed of ceramics, an epoxy resin, glass, a metal or any other suitable material, and ceramics, an epoxy resin, or glass may be selected as the insulting material when the base board 27h has the insulating function. When the base board 27h is formed of the insulating material, it is possible to prevent undesired electric discharge of the capacitor cell 27-1. In the event the base board 27h is formed of metal, the terminals 27e and 27f are to be suitably insulated therefrom. The bus bars 30, 31 are also to be suitably insulated from the underside of the base board 27h.

According to the present embodiment, since the bus bars 30, 31 and the electronic circuit board 40 are mounted on the capacitor cell 27-1, it is possible to minimize the length of the wiring between the terminals 27e, 27f and the electronic circuit board 40 and the lend of the bus bars 30, 31, whereby the impedance of the wiring can be reduced to substantially reduce the voltage drop in the capacitor cell 27-1 which is representative of all the capacitor cells of the capacitor-type power supply unit 1.

Figure 4:
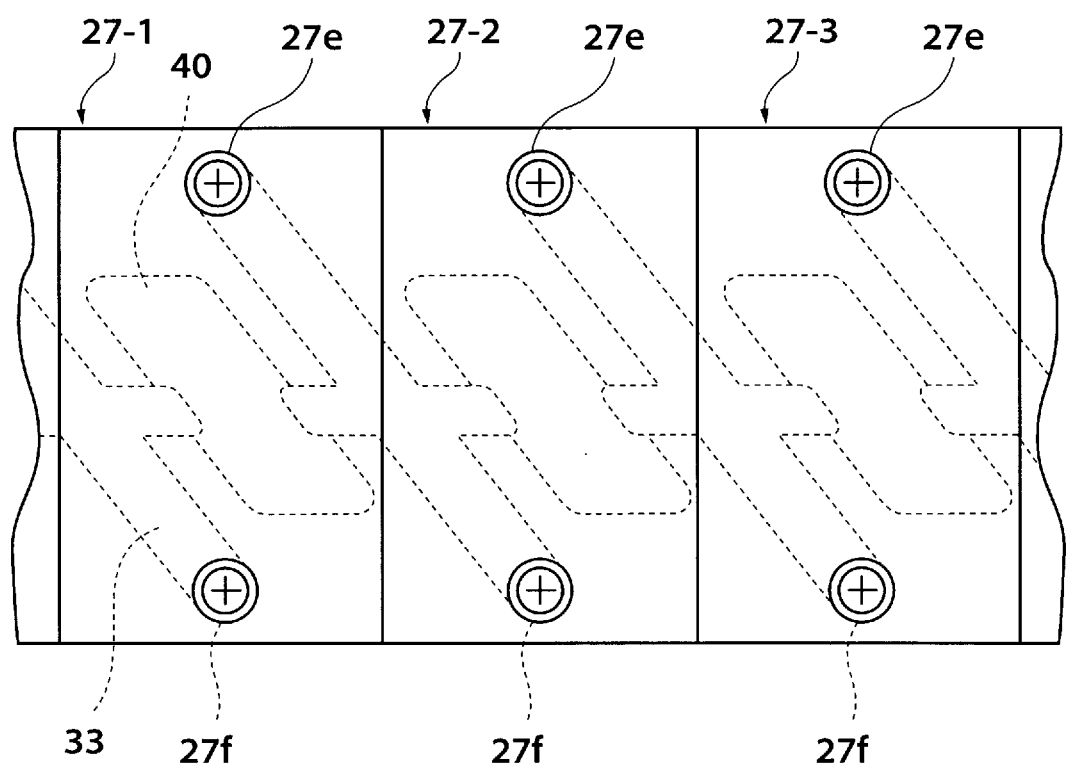
FIG. 4 is a schematic perspective view showing essential parts of a variation of the capacitor-type power supply unit according to the first embodiment.

Although in the above embodiment, the positive terminal 27e and the negative terminal 27f are alternatively arranged such that the negative terminal 27f of the capacitor cell 27-2 is opposed to the positive terminal 27e of the capacitor cell 27-1, and the positive terminal 273 of the capacitor cell 27-2 is opposed to the negative terminal 27f of the capacitor cell 27-1, this is not limitative but a variation thereof shown in FIG. 4 may be employed in which the positive terminal 27e of the capacitor cell 27-2 is opposed to the positive terminal 27e of the capacitor cell 27-1, and the negative terminal 27f of the capacitor cell 27-2 is opposed to the negative terminal 27f of the capacitor cell 27-1, i.e. the positive terminals 27e and the negative terminals 27f are arranged on respective identical sides of the capacitor cells. In this case, a bus bar 33 used therein takes a different shape from that of the bus bars 30, 31 used in the above embodiment, as shown in FIG. 4.

Figure 5:
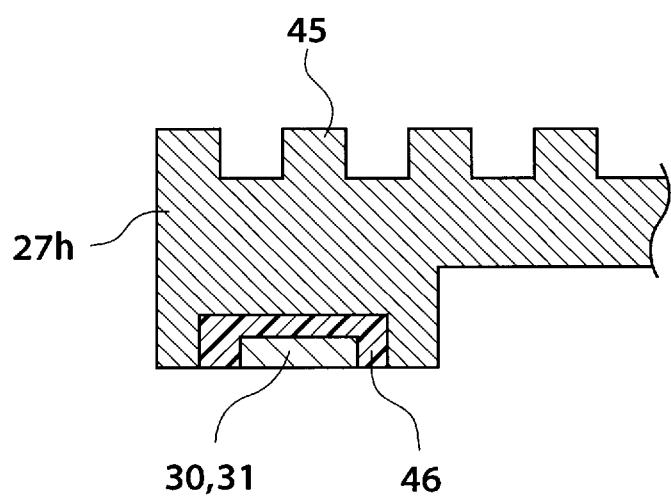
FIG. 5 is a partial cross-sectional view showing essential parts of another variation of the capacitor-type power supply unit according to the first embodiment.

FIG. 5 shows essential parts of another variation of the capacitor-type power supply unit according to the first embodiment, in cross section. As shown in the figure, the top of the base board 27h may be formed with radiating fins 45. The radiating fins act to prevent heat generated by the bus bars 30, 31, etc. from causing a rise in the temperature of the capacitor cells 27, 28.

Further, as shown in FIG. 5, an intermediate portion of the bus bar 30, 31 may be fixed to the base board 27h via a heat-resistant material 46, such as a resin and glass. This makes it possible to insulate the bus bar 30, 31 from the base board 27h and at the same time help heat generated by the bus bar 30, 31 to be transmitted to the fins 45 by conduction.

Next, capacitor-type power supply units according to other embodiments of the invention will be described with reference to FIGS. 6 to 10. In the following description, component elements and parts corresponding to those of the first embodiment are designated by identical reference numerals, and detailed description thereof is omitted.

Figure 6:
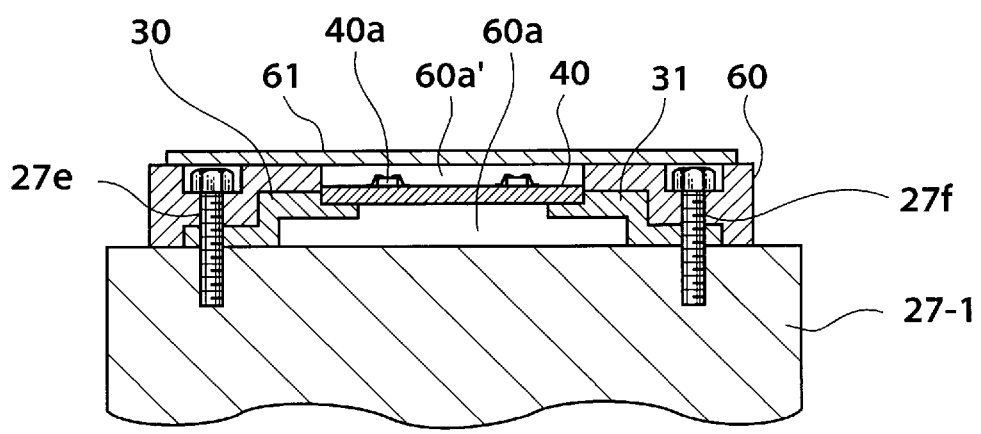
FIG. 6 is a partial cross-sectional view showing essential parts of a capacitor-type power supply unit according to a second embodiment of the invention.

FIG. 6 shows a capacitor-type power supply unit according to a second embodiment of the invention. As shown in the figure, a base board 60 having an outer shape adapted to the shape of a capacitor cell 27-1 in plan view is arranged on the top of the capacitor cell 27-1. The base board 60 is formed with through holes for receiving heads of a positive terminal 27e and a negative terminal 27f at respective locations, and has a recess 60a formed in the underside thereof for receiving an electronic circuit board 40 and bus bars 30 and 31 therein. Between the positive terminal 27e and the negative terminal 27h of the capacitor 27-1, the base board 60 is formed with a through hole 60a' opening into the recess 60a and corresponding in shape and size to the electronic circuit board 40.

The electronic circuit board 40 is fitted in the through hole 60a' of the base board 40 on the top of which are mounted electronic devices, one of which is designated by reference numeral 40a. The electronic circuit board 40 has one end thereof joined to an end of the bus bar 30, and the other end of the same to an end of the bus bar 31 by spot welding or the like.

The positive terminal 27e and the negative terminal 27f formed by respective electrode bolts fix the bus bars 30, 31 and the base board 60 to the capacitor cell 27-1. Further, a cover 61 is mounted on the top of the base board 60 by suitable means, for covering the through holes of the base board 27 through which the positive terminal 27e and the negative terminal 27f are screwed into the capacitor cell 27-1, and the through hole 60a. According to the present embodiment, by removing the cover 61, maintenance can be easily carried out for the electronic circuit board 40a.

Figure 7:
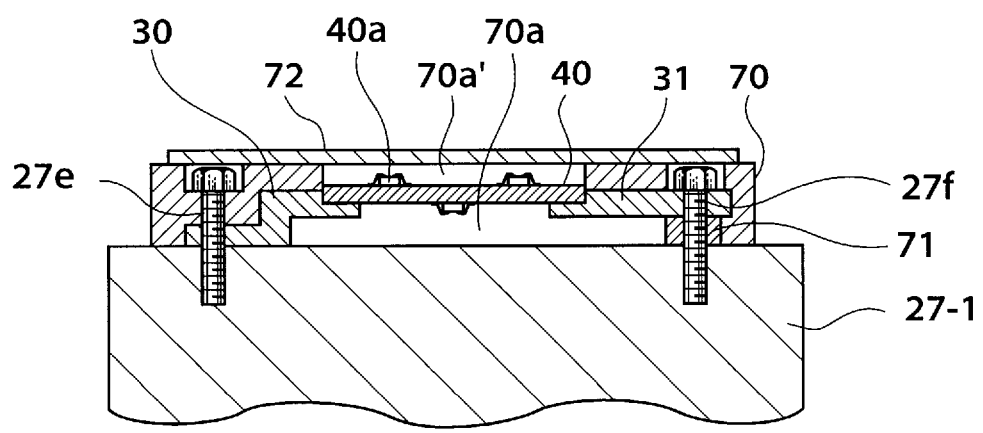
FIG. 7 is a partial cross-sectional view showing essential parts of a capacitor-type power supply unit according to a third embodiment of the invention.

FIG. 7 shows a capacitor-type power supply unit according to a third embodiment of the invention. In the figure, a base board 70 having an outer shape adapted to the shape of a capacitor cell 27-1 in plan view is arranged on the top of the capacitor cell 27-1. The base board 70 is formed with through holes for receiving heads of a positive terminal 27e and a negative terminal 27f at respective locations, and has a recess 70a formed in the underside thereof for receiving an electronic circuit board 40 and bus bars 30 and 31 therein. Between the positive terminal 27e and the negative terminal 27h of the capacitor 27-1, the base board 70 is formed with a through hole 70a' opening into the recess 70a and corresponding in shape and size to the electronic circuit board 40.

The electronic circuit board 40 is fitted in the through hole 70a' of the base board 70 both on the top and the bottom of which are mounted electronic devices, one of which is designated by reference numeral 40a. The electronic circuit board 40 has one end thereof joined to an end of the bus bar 30, and the other end thereof to an end of the bus bar 31 by spot welding or the like. The bus bar 31 is not stepped at ends thereof, but it is placed on the capacitor cell 27-1 with a spacer 71 interposed therebetween.

The positive terminal 27e and the negative terminal 27f formed by respective electrode bolts fix the bus bars 30, 31 and the base board 70 to the capacitor cell 27-1. Further, a cover 72 is mounted on the top of the base board 70 by suitable means for covering the through holes through which the positive terminal 27e and the negative terminal 27f are screwed into the capacitor cell 27-1, and the through hole 70a. According to the present embodiment, by removing the cover 72, maintenance can be easily carried out for the electronic circuit board 40a.

Figure 8:
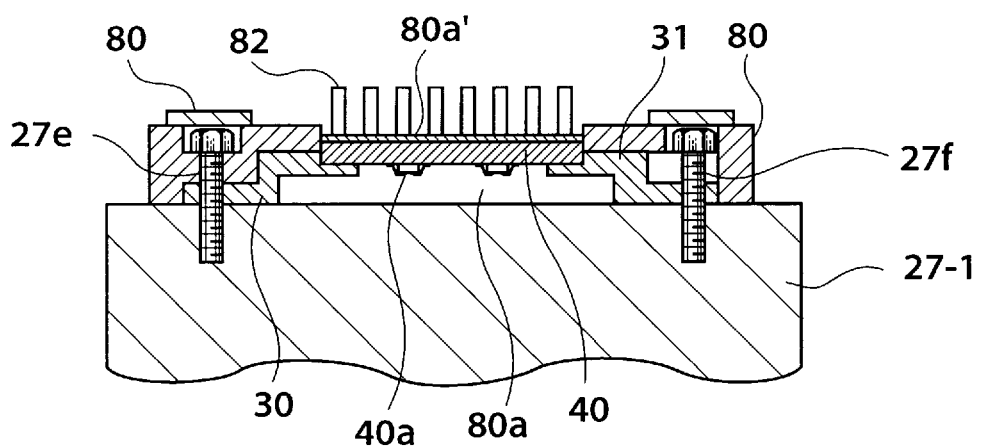
FIG. 8 is a partial cross-sectional view showing essential parts of a capacitor-type power supply unit according to a fourth embodiment of the invention.

FIG. 8 shows a capacitor-type power supply unit according to a fourth embodiment of the invention. In the figure, a base board 80 having an outer shape adapted to the shape of a capacitor cell 27-1 in plan view is arranged on the top of the capacitor cell 27-1. The base board 80 is formed with through holes for receiving heads of a positive terminal 27e and a negative terminal 27f at respective locations, and has a recess 80a formed in the underside thereof for receiving an electronic circuit board 40 and bus bars 30 and 31 therein. Between the positive terminal 27e and the negative terminal 27h of the capacitor 27-1, the base board 80 is formed with a through hole 80a' opening into the recess 80a and corresponding in shape and size to the electronic circuit board 40.

The electronic circuit board 40 is fitted in the through hole 80a' of the base board 80 only on the bottom of which are mounted electronic devices, one of which is designated by reference numeral 40a. The electronic circuit board 40 has one end thereof joined to an end of the bus bar 30, and the other end thereof to an end of the bus bar 31 by spot welding or the like.

The positive terminal 27e and the negative terminal 27f formed by respective electrode bolts fix the bus bars 30, 31 and the base board 80 to the capacitor cell 27-1. Further, a cover 72 is mounted on the top of the base board 80 by suitable means for covering the through holes through which the positive terminal 27e and the negative terminal 27f are screwed into the capacitor cell 27-1, respectively. Further, radiating fins 82 are mounted on the top of the electronic circuit board 40 such that they cover the through hole 80a'. This makes it possible to dissipate heat generated by the electronic circuit 40a, thereby preventing a temperature rise of the capacitor cell 27-1.

Figure 9:
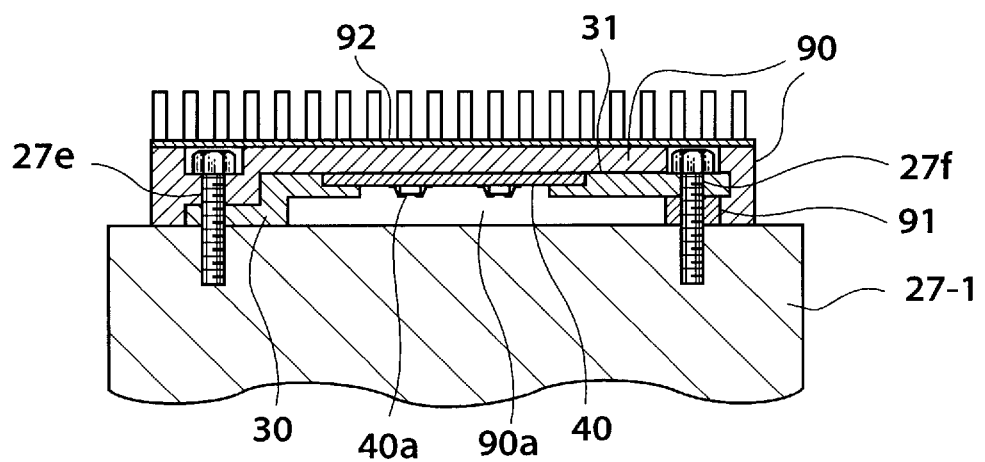
FIG. 9 is a partial cross-sectional view showing essential parts of a capacitor-type power supply unit according to a fifth embodiment of the invention.

FIG. 9 shows a capacitor-type power supply unit according to a fifth embodiment of the invention. In the figure, a base board 90 having an outer shape adapted to the shape of a capacitor cell 27-1 in plan view is arranged on the top of the capacitor cell 27-1. The base board 90 is formed with through holes for receiving heads of a positive terminal 27e and a negative terminal 27f at respective locations, and has a recess 90a formed in the underside thereof for receiving an electronic circuit board 40 and bus bars 30 and 31 therein.

The electronic circuit board 40 is mounted on the bottom of the recess 90a of the base board 90 only on the bottom of which are mounted electronic devices, one of which is designated by reference numeral 40a. The electronic circuit board 40 has one end thereof joined to an end of the bus bar 30, and the other end thereof to an end of the bus bar 31 by spot welding or the like. The bus bar 31 is not stepped at ends thereof, but is flat in shape, and placed on the capacitor cell 27-1 with a spacer 91 interposed therebetween. It should be noted that similarly to the bus bar 31, the bus bar 30 may be also flat in shape and placed on the capacitor cell 27-1 with a spacer interposed therebetween.

The positive terminal 27e and the negative terminal 27f formed by respective electrode bolts fix the bus bars 30, 31 and the base board 90 to the capacitor cell 27-1. Further, a cover 92 formed with radiating fins is mounted on the top of the electronic circuit board 40 by suitable means. This makes it possible to dissipate heat generated by the electronic circuit 40a, thereby preventing a temperature rise of the capacitor cell 27-1.

Figure 10:
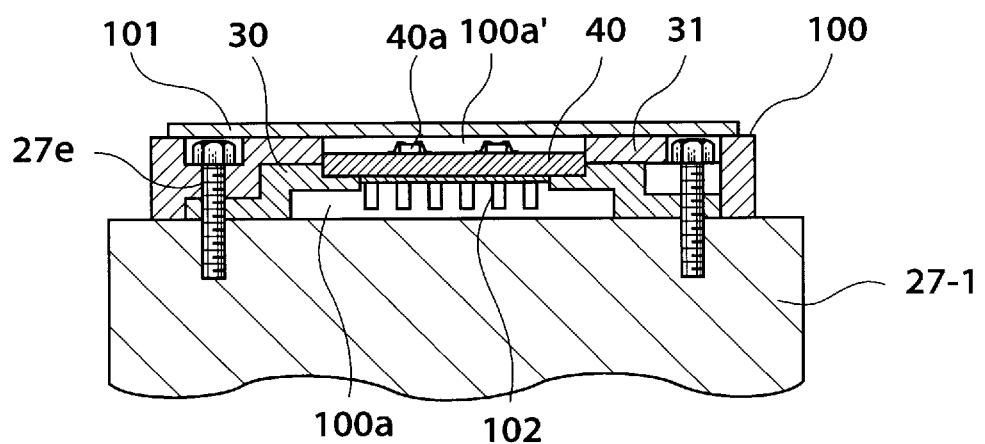
FIG. 10 is a partial cross-sectional view showing essential parts of a capacitor-type power supply unit according to a sixth embodiment of the invention.

FIG. 10 shows a capacitor-type power supply unit according to a sixth embodiment of the invention. In the figure, a base board 100 having an outer shape adapted to the shape of a capacitor cell 27-1 in plan view is arranged on the top of the capacitor cell 27-1. The base board 100 is formed with through holes for receiving heads of a positive terminal 27e and a negative terminal 27f at respective locations, and has a recess 100a formed in the underside thereof for receiving an electronic circuit board 40 and bus bars 30 and 31 therein. Between the positive terminal 27e and the negative terminal 27h of the capacitor 27-1, the base board 100 is formed with a through hole 100a' opening into the recess 100a and corresponding in shape and size to the electronic circuit board 40.

The electronic circuit board 40 is fitted in the through hole 100a' of the base board 100 only on the top of which are mounted electronic devices, one of which is designated by reference numeral 40a. The electronic circuit board 40 has one end thereof joined to an end of the bus bar 30, and the other end thereof to an end of the bus bar 31 by spot welding or the like.

The positive terminal 27e and the negative terminal 27f formed by respective electrode bolts fix the bus bars 30, 31 and the base board 100 to the capacitor cell 27-1. Further, a cover 101 is mounted on the top of the base board 100 by suitable means for covering the through holes through which the positive terminal 27e and the negative terminal 27f are screwed into the capacitor cell 27-1, and the through hole 100a. According to the present embodiment, by removing the cover 72, maintenance can be easily carried out for the electronic circuit board 40a. Further, radiating fins 102 are mounted on the underside of the electronic circuit board 40. This makes it possible to dissipate heat generated by the electronic circuit board 40a.

In the above description, the material of the base boards 60, 70, 80, 90, and 100 may be identical with that of the base board 27h of the first embodiment, and an intermediate portion of the bus bar 30, 31 has a similar shape to that of the bus bar 30, 31 of the first embodiment, and is in contact with the underside of the base board 60, 70, 80, 90, 100, similarly to the first embodiment (see FIG. 3B).

What is claimed is:

1. In a capacitor-type power supply unit including at least a capacitor block having a plurality of capacitor cells, and bus bars connecting said capacitor cells in series, and a plurality of electronic circuit boards connected respectively to said capacitor cells, for controlling corresponding ones of said capacitor cells, the improvement wherein said electronic circuit boards and said bus bars are mounted on said capacitor cells.

2. A capacitor-type power supply unit according to claim 1, wherein said capacitor-type power supply unit is installed on an electric vehicle.

3. A capacitor-type power supply unit according to claim 1, including a base board mounted on a top of each of said capacitor cells, said one of said electronic circuit boards and one of said bus bars corresponding to said one of said electronic circuit boards being mounted on said base board.

4. A capacitor-type power supply unit according to claim 3, including radiating fins provided on said base board.

5. A capacitor-type power supply unit according to claim 3, wherein said base board and said top of said each of said capacitor cells define a space therebetween, said one of said electronic circuit boards and said one of said bus bars corresponding to said one of said electronic circuit boards being accommodated within said space.

6. A capacitor-type power supply unit according to claim 5, wherein said one of said bus bars corresponding to said one of said electronic circuit boards is fixed to said underside of said base board via an insulating material interposed therebetween.

7. A capacitor-type power supply unit according to claim 3, wherein said base board is formed of an insulating material.

8. A capacitor-type power supply unit according to claim 3, wherein said each of said capacitor cells has a positive electrode and a negative electrode, said one of said bus bars corresponding to said one of said electronic circuit boards connecting said positive electrode of said each of said capacitor cells to said negative electrode of another one of said capacitor cells adjacent to said each of said capacitor cells.

9. A capacitor-type power supply unit according to claim 8, wherein said capacitor cells are arranged in a manner such that one of said positive electrode and said negative electrode of said each of said capacitor cells and one of said positive electrode and said negative electrode of said another one of said capacitor cells adjacent to said each of said capacitor cells, which is opposite in polarity to said one of said positive electrode and said negative electrode of said each of said capacitor cells, are located on the same side of said capacitor cells.

10. A capacitor-type power supply unit according to claim 8, wherein said capacitor cells are arranged in a manner such that one of said positive electrode and said negative electrode of said each of said capacitor cells and one of said positive electrode and said negative electrode of said another one of said capacitor cells adjacent to said each of said capacitor cells, which is the same in polarity to said one of said positive electrode and said negative electrode of said each of said capacitor cells, are located on the same side of said capacitor cells.

11. A capacitor-type power supply unit according to claim 8, wherein said positive electrode and said negative electrode of said each of said capacitor cells are formed by electrode bolts, each of said electrode bolts fixing said base board and said one of said bus bars corresponding to said one of said electronic circuit boards to said each of said capacitor cells.

12. A capacitor-type power supply unit according to claim 11, wherein said base board and said top of said each of said capacitor cells define a space therebetween, said one of said electronic circuit boards and said one of said bus bars corresponding to said one of said electronic circuit boards being accommodated within said space.

13. A capacitor-type power supply unit according to claim 12, wherein said one of said electronic circuit boards is fixedly sandwiched between said one of said bus bars corresponding to said one of said electronic circuit boards and an underside of said base board.

14. A capacitor-type power supply unit according to claim 13, wherein each of said electronic circuit boards has at least one electronic part mounted thereon, said each of said electronic circuit boards being disposed in a manner such that said at least one electronic part faces toward said top of one of said capacitor cells corresponding to said each of said electronic circuit boards.

15. A capacitor-type power supply unit according to claim 13, wherein said base board has a through hole formed therein and corresponding in size to a size of said one of said electronic circuit boards, said one of said electronic circuit boards being mounted in said through hole and having at least one electronic part mounted on a side thereof remote from said each of said capacitor cells, said capacitor-type power supply unit including a cover for covering said through hole.

16. A capacitor-type power supply unit according to claim 15, wherein said one of said electronic circuit boards has radiating fins mounted on a side thereof facing toward said each of said capacitor cells.

17. A capacitor-type power supply unit according to claim 13, wherein said base board has a through hole formed therein and corresponding in size to a size of said one of said electronic circuit boards, said one of said electronic circuit boards being mounted in said through hole and having at least two electronic parts mounted both on a side thereof remote from said each of said capacitor cells and a side thereof facing toward said each of said capacitor cells, said capacitor-type power supply unit including a cover for covering said through hole.

18. A capacitor-type power supply unit according to claim 13, wherein said base board has a through hole formed therein and corresponding in size to a size of said one of said electronic circuit boards, said one of said electronic circuit boards being arranged on said one of said bus bars corresponding to said one of said electronic circuit boards, said capacitor-type power supply unit including a cover for covering said through hole, said cover having radiating fins mounted thereon.

19. A capacitor-type power supply unit according to claim 13, wherein said electrode bolts have heads, said base board having through holes formed therein, for receiving said heads of said electrode bolts, respectively, said capacitor-type power supply unit including a cover for covering said top of said base board including said holes, said cover having radiating fins mounted thereon.

* * * * *